(12) United States Patent
Hermosillo et al.

(10) Patent No.: US 9,799,472 B1
(45) Date of Patent: Oct. 24, 2017

(54) GAS INSULATED HIGH VOLTAGE ELECTRICAL DEVICE EQUIPPED WITH AN ENHANCED PARTICLE TRAP

(71) Applicant: General Electric Technology GmbH, Baden (CH)

(72) Inventors: Victor F. Hermosillo, Bethel Park, PA (US); Justin M. Rebovich, Perryopolis, PA (US)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 0 days.

(21) Appl. No.: 15/411,462

(22) Filed: Jan. 20, 2017

(51) Int. Cl.
*H01H 33/56* (2006.01)
*H01H 33/64* (2006.01)

(52) U.S. Cl.
CPC ............ *H01H 33/56* (2013.01); *H01H 33/64* (2013.01)

(58) Field of Classification Search
CPC .................. H01H 33/56; H01H 9/342; H01H 2033/66292; H01H 2033/66284; H01H 33/66261; H01H 2033/66276; H01H 33/24; H01H 1/2058; H01H 31/003; H01H 33/561; H01H 33/6645; H01H 2009/305; H01H 2033/66223
See application file for complete search history.

(56) References Cited

U.S. PATENT DOCUMENTS

| | | | |
|---|---|---|---|
| 3,898,408 A * | 8/1975 | Cookson | B03C 3/00 218/43 |
| 6,307,172 B1 | 10/2001 | Bolin et al. | |
| 7,858,877 B2 | 12/2010 | Nowakowski et al. | |
| 2014/0166623 A1* | 6/2014 | Page, II | H01H 9/341 218/157 |
| 2015/0294819 A1* | 10/2015 | Opfer | H01H 33/64 218/90 |
| 2015/0311016 A1* | 10/2015 | Dahm | H01H 33/56 218/97 |

FOREIGN PATENT DOCUMENTS

| | | |
|---|---|---|
| EP | 2 079 136 A1 | 7/2009 |
| JP | H9-98526 A | 4/1997 |
| WO | 2005/008856 A3 | 1/2005 |
| WO | 2006/000178 A1 | 1/2006 |

* cited by examiner

*Primary Examiner* — Truc Nguyen
(74) *Attorney, Agent, or Firm* — GE Global Patent Operation; Scott R. Stanley

(57) ABSTRACT

A gas insulated high voltage electrical device comprising: at least one conductor for conducting a high voltage current; a longitudinal enclosure for enclosing the at least one conductor, the longitudinal enclosure comprising an interior wall extending along a longitudinal axis; a particle trap formed on the interior wall and extending along the longitudinal axis, the particle trap comprising a part of the interior wall and a longitudinal shielding cover extending along the longitudinal axis to delimit a dielectrically shielding area in the enclosure for trapping particles; the shielding cover being made of an electrically conducting material and comprising at least two electrical connections to the interior wall spaced from each other along the longitudinal axis, the shielding cover comprising a mechanical resonating frequency that makes the shielding cover longitudinally oscillate when the high voltage current passes through the conductor.

8 Claims, 4 Drawing Sheets

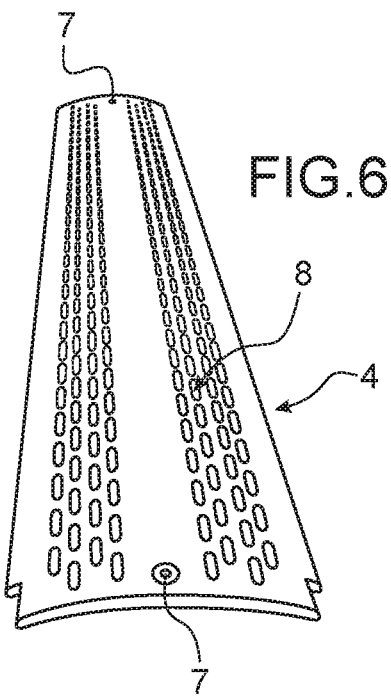
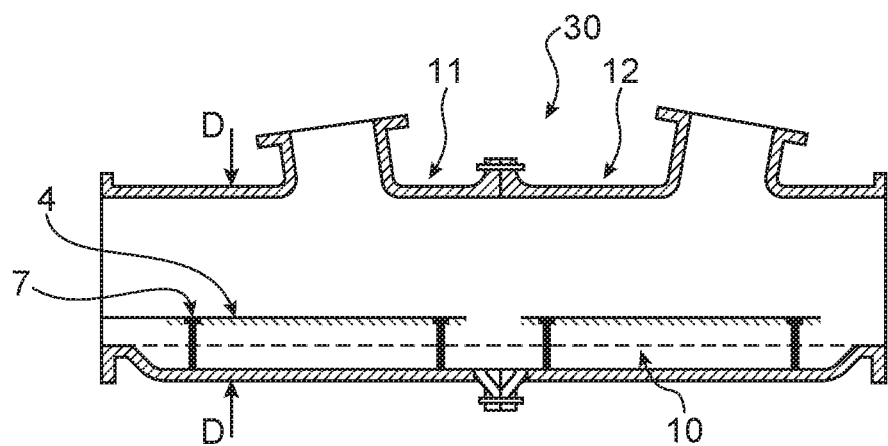
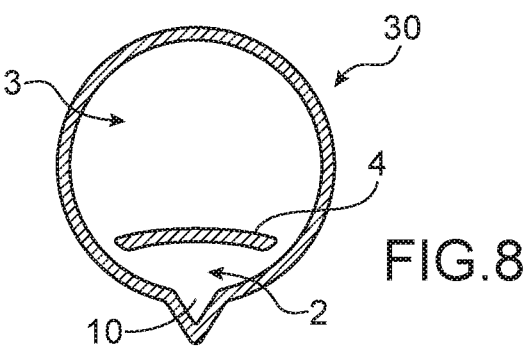

GAS INSULATED HIGH VOLTAGE ELECTRICAL DEVICE EQUIPPED WITH AN ENHANCED PARTICLE TRAP

BACKGROUND

Technical Field

The present invention relates to gas-insulated high-voltage circuit breakers and more particularly to circuit breakers having particle traps.

State of the Prior Art

In circuit breakers (eg. dead-tank circuit breaker, Gas Insulated Switchgear (GIS), etc.), the presence or generation of particles of dielectric or metallic material (for example, by parts which rub mechanically against one another or by the damage and surface wear of the arcing contacts caused by the formation of electric arcs) inside the tank (breaking chamber enclosure) can trigger a voltage breakdown between live and grounded parts of a high-voltage power circuit breaker. Indeed, conductive particles move towards the highest dielectrically stressed live parts. These particles can lift-off, float or stand-up under the influence of the voltage, reducing the required dielectric clearance and increasing the voltage gradients. This can lead to a dielectric breakdown of the gap between the interrupter and the tank.

In order to assure effective circuit breaker operation, nowadays tanks are equipped with means for trapping the particles.

Particle traps are stationary elements. Their shape is designed to promote the movement of particles so that these are transported under a shielded area in which the electric field intensity is negligible. In this protected region, particle motion due to the electric field is no longer possible.

These particle traps are disposed along the surface of the tank and are generally depressions or cavities formed into the wall of the tank, in which zero or near zero electric fields are created. In operation, particles are guided to the particle trap by an electric field which exists between the live and grounded parts of the circuit breaker and are trapped by the low electric field in the trap.

An example of a particle trap of the prior art (U.S. Pat. No. 6,307,172) is illustrated in FIG. 1 and FIG. 2. It represents a tank 30 with a particle trap 29 in the form of an elongated, recessed channel located on the bottom of the tank, the channel being axially directed relative to a longitudinal axis of the tank and extending substantially between both ends of the tank (FIG. 1 and FIG. 2).

Another example of a particle trap of the prior art (U.S. Pat. No. 7,858,877) is illustrated in FIG. 3. There is a circuit breaker tank 30 with a circular well-shaped particle trap 19. In the illustrated embodiment of the prior art, the bottom wall of the tank is inclined in the direction of the particle traps 19 and the particle traps 19 are covered by covering shrouds 13 having a shielding surface for dielectric shielding of shielding area.

These prior art solutions have the disadvantage that, if a particle stops moving or gets stuck, lodged or obstructed by features on or around the trap where it still can cause a breakdown of the insulation, there is no means to dislodge the particle.

BRIEF SUMMARY OF THE INVENTION

The invention aims at overcoming the disadvantages of the prior art solutions. To this purpose, the invention proposes a gas insulated high voltage electrical device comprising:

at least one conductor for conducting a high voltage current;

a longitudinal enclosure (also herein after called "tank") for enclosing the at least one conductor, the longitudinal enclosure comprising an interior wall extending along a longitudinal axis;

a particle trap formed on the interior wall and extending along the longitudinal axis, the particle trap comprising a part of the interior wall and a longitudinal shielding cover extending along the longitudinal axis to delimit a dielectrically shielding area in the enclosure for trapping particles;

the shielding cover being made of an electrically conducting material and comprising at least two electrical connections to the interior wall spaced from each other along the longitudinal axis, the shielding cover comprising a mechanical resonating frequency that makes the shielding cover longitudinally oscillate when the high voltage current passes through the conductor.

The shielding cover is shaped to promote oscillations, thus provoking the movement of particles located on the surface of the shielding cover. The shielding cover oscillations lead the particles to fall in the shielding area of the particle trap, by causing motion of the particles in order to transport them inside the particle trap.

Certain preferred but not limiting features of this circuit breaker device are as follows:

the electrically conducting material of the shielding cover is preferably a non-ferromagnetic material. The use of a non-ferromagnetic material helps to reduce possible eddy currents and associated heating. Preferably, the non-ferromagnetic material is aluminum;

the mechanical resonating frequency is tuned to an operating frequency of the conductor; the mechanical resonating frequency can be 50 or 60 Hz, or a multiple of these frequencies (harmonics);

the shielding cover comprises a plurality of through holes; they can form openings in the surface of the shielding cover for the passage of the particles into the shielding area;

the two electrical connections are mechanical fixing means made of an electrically conducting material; they are provided in order to maintain electrical contact between the interior wall and the shielding cover; they can be metallic screws or bolts;

the device further comprises at least two elements made of a flexible material and positioned at the mechanical fixing means between the interior wall and the shielding cover; their function is to damp any noise produced by the oscillations of the shielding cover on the interior wall;

the part of the interior wall belonging to the particle trap has a longitudinal depression extending along the longitudinal axis and the shielding surface spans the depression. For example, the depression can be a groove. Alternatively, the tank section can be round in the top section 14 and oval in the lower section 15 as illustrated in FIG. 9, the oval shape of the lower section of the tank allowing space for the particle trap.

An advantage of the present invention is that it allows an increased effectiveness in transporting particles into the protected region of the particle trap.

Another advantage is that the shielding cover is configured so that vibrations are caused naturally through the interactions between the current passing through the interrupter and the small current circulating in the tank.

Additional features and advantages of the present invention are described in, and will be apparent from, the detailed description of the preferred embodiments, the figures and the claims.

BRIEF DESCRIPTION OF THE DRAWINGS

FIG. 6 is a schematic perspective view of the shielding cover of the particle traps according to an embodiment of the invention.

FIG. 7 is a schematic sectional side view of a tank equipped with two particle traps according to another embodiment of the invention.

FIG. 8 is a schematic sectional side view of the tank as taken generally along line D-D of FIG. 7.

Figure 1:
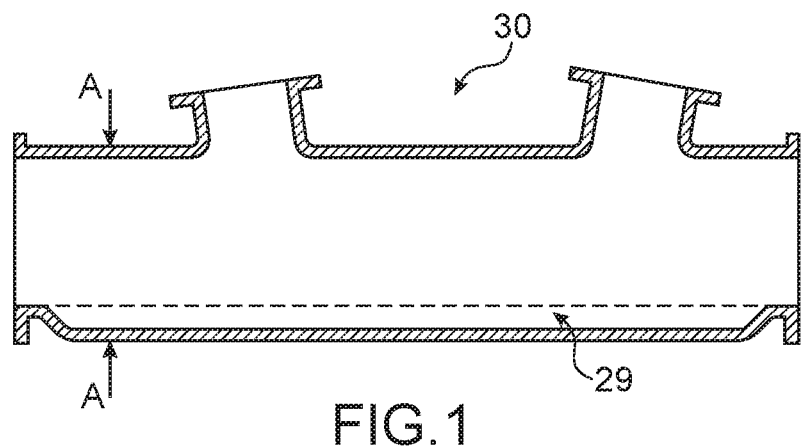
FIG. 1 is a schematic sectional side view of a tank of the prior art with a channel-shaped particle trap extending substantially between both ends of the tank.
Figure 2:
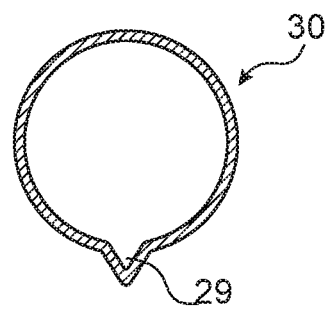
FIG. 2 is a schematic sectional side view of the tank as taken generally along line A-A of FIG. 1.
Figure 3:
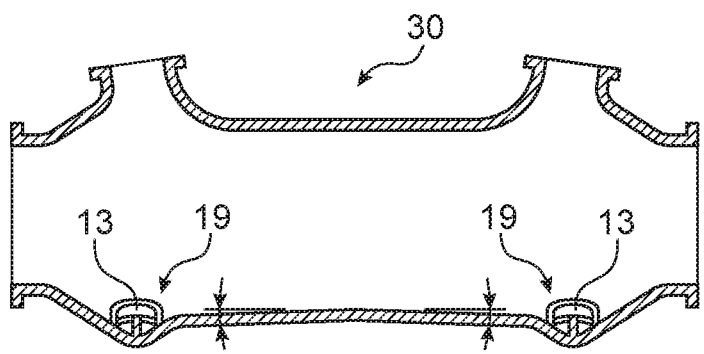
FIG. 3 is a schematic sectional side view of a tank of the prior art with two well-shaped particle traps.

Please note that the conductor for conducting a high voltage current in the gas insulated high voltage electrical device is not represented in the figures.

DETAILED DESCRIPTION

In high voltage power circuit breakers rated 36 kV up to 1200 kV, a small current circulates on the tank and is induced by the magnetic coupling to the electrical field generated by the main conductor. This small current causes interaction between the main current circulating in the circuit breaker and it generates a force normal to the surface of the shielding cover (force alternatively going up and down with an alternating current).

If a longitudinal shielding cover, which is electrically connected to the tank, is placed longitudinally in the tank, the induced current will flow parallel to the current in the primary circuit.

The flow of this induced current in parallel with the interrupter, disconnect switch or bus allows for interaction between the magnetic field B(t) generated by the load current flowing through the main circuit and the current flowing through the particle trap and this interaction results in a cyclical force directed up and down. If the shielding cover is shaped properly through a combination of length, thickness and width, the cyclical force will cause the shielding cover of the particle trap to flex and oscillate. In other words, if the shielding cover is shaped properly, it can mechanically vibrate at an operating frequency of the circuit (generally at 50 or 60 Hz) by means of the interaction between the current circulating in the primary circuit of the circuit (a circuit breaker interrupter, disconnect switch or bus) in a circuit breaker (for example a dead-tank circuit breaker, GIS section or GIL) and the current flowing through the tank and the shielding cover of the particle trap.

By means of the resulting vibrations, particles stucked on the surface of the shielding cover can be dislodged, shaken-off to fall into the protected region of the trap.

The shielding cover of the particle trap according to the invention is made of an electrically conductive material. Preferably, it is a non-ferromagnetic material, such as aluminum.

The shielding cover is placed longitudinal to the longitudinal axis of the tank.

The shielding cover must be electrically connected to the interior wall of the tank. The shielding cover can be fixed on both ends on embossed features realized on the tank bottom.

The shielding cover of the particle trap can be affixed to the tank by means of a metallic screw or bolt in order to maintain electrical contact necessary for the flow of current through the shielding cover.

The noise level generated by the mechanical vibration of the shielding cover can be damped by placing rubber spacers at the fixation points between the shielding cover and the tank emboss used for fixation. The shielding cover ends are fixed to the tank by means of a conductive element such as a metallic screw or bolt.

One or multiple particle traps according to the invention can be placed along the tank bottom, depending on the length necessary to tune. For example, one particle trap according to the invention can span the entire length of a tank.

Figure 4:
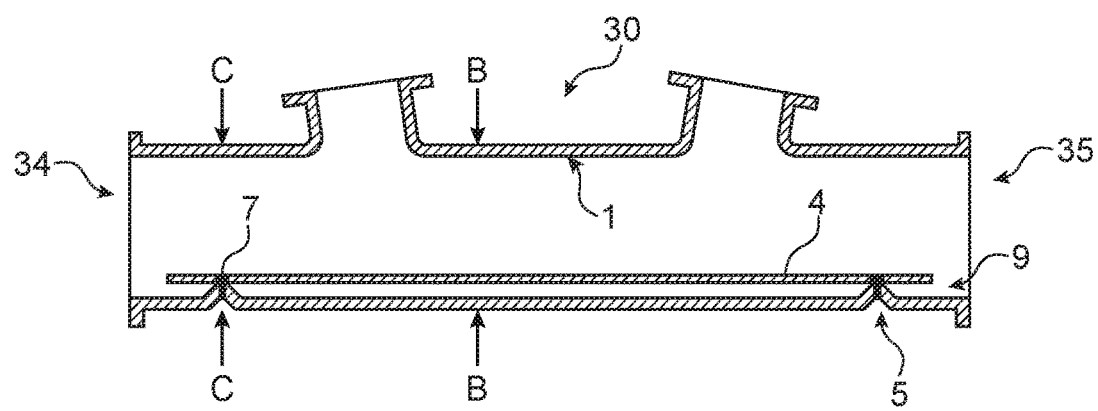
FIG. 4 is a schematic sectional side view of a tank equipped with a particle trap according to an embodiment of the invention, the particle trap extending substantially between both ends of the tank.

FIG. 4 illustrates a tank 30 for a high-voltage circuit breaker, equipped with a particle trap 9 according to the invention. In this embodiment, the particle trap 9 (and its shielding cover 4) extends substantially between both ends 34, 35 of the tank 30.

Figure 5A:
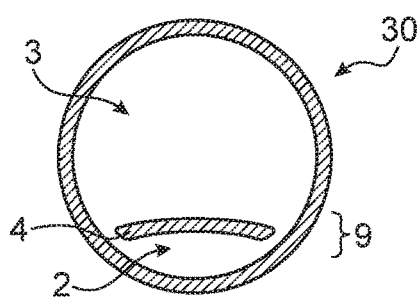
FIG. 5a is a schematic sectional side view of the tank as taken generally along line B-B of FIG. 4.

FIG. 5a is a sectional view showing the tank 30, the trap 9, the protected region 2 and the exposed region 3, the protected region 2 being delimited by the shielding cover 4 and a part of the interior wall 1 of the tank.

Figure 5B:
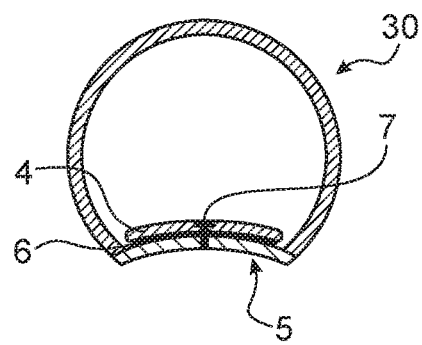
FIG. 5b is a schematic sectional side view of the tank as taken generally along line C-C of FIG. 4.

FIG. 5b is a sectional view showing the fixation of the shielding cover 4 on the interior wall 1 of the tank with a mechanical fixing means 7 (for example, a screw) made of an electrically conducting material. In this embodiment, the interior wall 1 has an embossed feature 5 that facilitates the fixation of the mechanical fixing means 7. There is also a rubber pad 6 placed between the shielding cover 4 and the interior wall 1.

FIG. 6 illustrates a perspective view of a shielding cover 4 according to the invention, the shielding cover here comprising openings 8 (through holes) in its surface.

Figure 9:
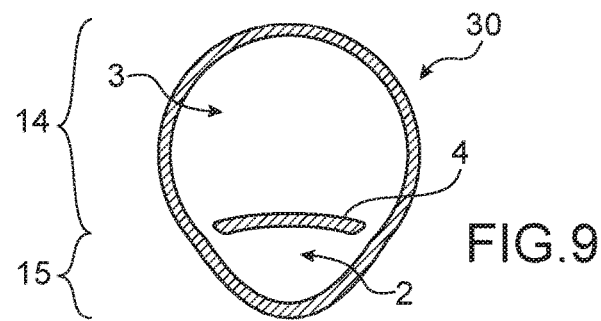
FIG. 9 is a schematic sectional side view of the tank according to an embodiment of the invention.

FIG. 7 illustrates a tank 30 for a high-voltage circuit breaker, equipped with two particle traps 9 according to the invention. In this embodiment, the tank 30 is a two-piece tank, comprising two identical pieces (half tank piece 11, 12) assembled together. The tank further comprises a depression 10 (groove) in the bottom of the tank (FIG. 8). The depression can also be formed by the oval shape of the bottom section of the tank (FIG. 9).

The present invention is applicable to all high-voltage circuit breakers, for dead-tank circuit breaker (for example, a dead tank circuit breaker for 550 kV (DT2-550 of Alstom Grid) or for 245 kV (HGF 1014 of Alstom Grid)), even three-phase high-voltage dead-tank circuit breakers, for elements in GIS (Gas Insulated Switchgear) such as circuit breakers, disconnect switches and bus sections, as well as for GIL (Gas Insulated Lines).

Simulations have been performed with the software Ansys™ with a three dimensional model of the particle trap.

Figure 10A:
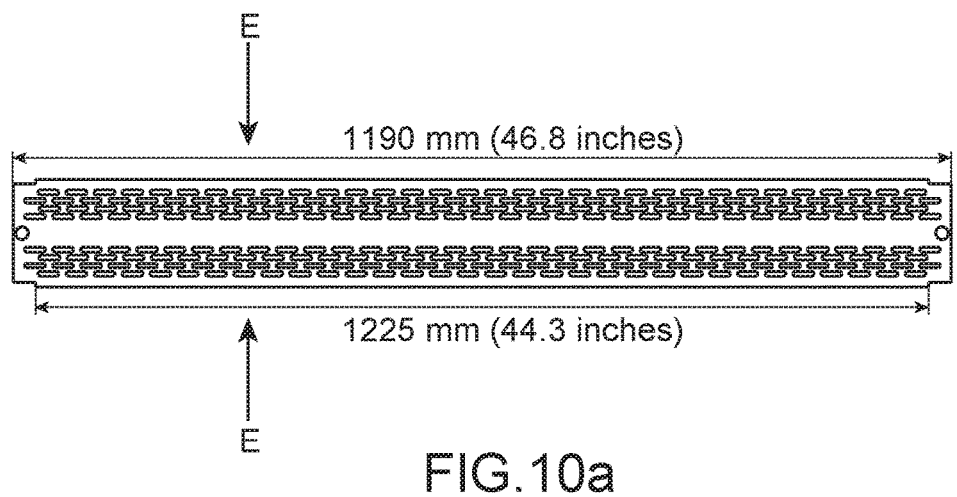
FIGS. 10a and 10b are respectively a schematic top view (FIG. 10a) and a schematic sectional side view (FIG. 10b) (as taken along line E-E of FIG. 10a) of the particle trap according to an embodiment of the invention.
Figure 10B:
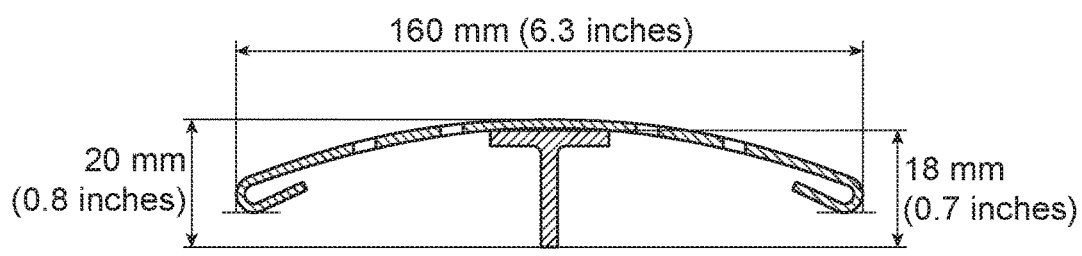

The shielding cover of the particle trap was modeled as a solid body with perforations as illustrated in FIG. 10a and FIG. 10b. For example, the perforations are 25 mm (0.98 inch) in length, 5 mm (0.2 inch) in width and spaced 10 mm (0.39 inch) apart. The dimensions of this shielding cover as illustrated in FIG. 10a and FIG. 10b are suitable for an installation in a longitudinal enclosure having an internal diameter of 810 mm (31.9 inches) and a longitudinal dimension of 1620 mm (63.8 inches). Please note that the dimensions of the shielding cover as illustrated in FIG. 10a and FIG. 10b are only given by way of example and not limiting.

We have obtained relevant vibration modes at a frequency of 50.9 Hz (that is to say a frequency near 50 Hz), a frequency of 59.2 Hz (that is to say a frequency near 60 Hz) and a frequency of 188.4 Hz (that is to say an harmonic of 60 Hz).

A field test was also conducted on a DT2-550 circuit breaker (which is a dead tank circuit breaker for 550 kV of Alstom Grid) equipped with a particle trap according to the invention. The vibrations of the shielding cover were indirectly observed by acoustic means.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas insulated high voltage electrical device comprising:
    at least one conductor for conducting a high voltage current;
    a longitudinal enclosure for enclosing the at least one conductor, the longitudinal enclosure comprising an interior wall extending along a longitudinal axis;
    a particle trap formed on the interior wall and extending along the longitudinal axis, the particle trap comprising a part of the interior wall and a longitudinal shielding cover extending along the longitudinal axis to delimit a dielectrically shielding area in the enclosure for trapping particles;
    the shielding cover being made of an electrically conducting material and comprising at least two electrical connections to the interior wall spaced from each other along the longitudinal axis, the shielding cover comprising a mechanical resonating frequency that makes the shielding cover longitudinally oscillate when the high voltage current passes through the conductor.

2. The device of claim 1, wherein the electrically conducting material of the shielding cover is a non-ferromagnetic material.

3. The device of claim 2, wherein the non-ferromagnetic conducting material of the shielding cover is aluminum.

4. The device of claim 1, wherein the mechanical resonating frequency is tuned to an operating frequency of the conductor.

5. The device of claim 1, wherein the shielding cover comprises a plurality of through holes.

6. The device of claim 1, wherein the two electrical connections are mechanical fixing means made of an electrically conducting material.

7. The device of claim 6, further comprising at least two elements made of a flexible material and positioned at the mechanical fixing means between the interior wall and the shielding cover.

8. The device of claim 1, wherein the part of the interior wall belonging to the particle trap has a longitudinal depression extending along the longitudinal axis and the shielding surface spans the depression.

* * * * *